(12) United States Patent
Hoffman (10) Patent No.: US 8,938,530 B2
(45) Date of Patent: Jan. 20, 2015

(54) METHOD AND SYSTEM FOR IDENTIFYING DYNAMIC CONTENT IN HYPERTEXT TRANSFER PROTOCOL (HTTP) RESPONSES

(75) Inventor: William Matthew Hoffman, Atlanta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1218 days.

(21) Appl. No.: 12/365,771

(22) Filed: Feb. 4, 2009

(65) Prior Publication Data

US 2010/0199170 A1    Aug. 5, 2010

(51) Int. Cl.
*G06F 15/173*   (2006.01)
*H04L 29/06*    (2006.01)
*H04L 29/08*    (2006.01)

(52) U.S. Cl.
CPC ............ *H04L 63/1416* (2013.01); *H04L 67/02* (2013.01); *H04L 63/1441* (2013.01)

USPC .......... 709/224; 709/230; 715/226; 715/234; 715/760

(58) Field of Classification Search
USPC ............................ 709/230; 715/234, 226, 760
See application file for complete search history.

(56) References Cited

U.S. PATENT DOCUMENTS

| | | | |
|---|---|---|---|
| 5,978,828 A | 11/1999 | Greer et al. .................. 709/2.24 |
| 6,286,043 B1* | 9/2001 | Cuomo et al. ................ 709/223 |
| 7,451,393 B1* | 11/2008 | Herbison et al. .............. 715/234 |
| 2001/0044820 A1 | 11/2001 | Scott ............................. 709/202 |
| 2005/0086212 A1* | 4/2005 | Hughes et al. ..................... 707/3 |
| 2006/0015632 A1* | 1/2006 | Tiemann et al. ............... 709/230 |
| 2009/0300709 A1* | 12/2009 | Chen et al. ........................ 726/1 |

* cited by examiner

*Primary Examiner* — Hitesh Patel

(57) ABSTRACT

Identifying of dynamic content in HTTP responses includes comparing responses to HTTP requests, identifying portions of the responses that are different as dynamic content, and creating a template that designates the dynamic content.

15 Claims, 5 Drawing Sheets

METHOD AND SYSTEM FOR IDENTIFYING DYNAMIC CONTENT IN HYPERTEXT TRANSFER PROTOCOL (HTTP) RESPONSES

BACKGROUND

HyperText Markup Language (HTML) is the predominant markup language used for delivering and displaying Web pages. It provides a means to describe the structure of text-based information in a web page by denoting certain text as links, headings, paragraphs, lists, and so on. HTML code can be written by a web designer, and/or can be generated automatically. A web server provides the HTML code in response to a request for a web page in accordance with the HyperText Transfer Protocol (HTTP). The HTML code is then received by a web client and rendered by a web browser as a web page for viewing. HTML code can also supplement markup text with interactive forms, embedded images, and other objects. HTML code is written in the form of tags, surrounded by angle brackets.

HTML comprises components called "elements." Elements provide the basic structure for HTML markup. Elements have two basic properties: attributes and content. Each attribute and each element's content has certain restrictions that must be followed for an HTML document to be considered valid. An element has a start tag (e.g., <element-name>) and usually an end tag (e.g., </element-name>). The element's attributes are contained in the start tag, and any content is located between the start and the end tags (e.g., <element-name attribute="value">Content</element-name>). Some elements, such as <br>, do not have any content and do not have a closing tag.

A malicious user can attack the operation or performance of a web server, such as by gaining unauthorized access to the server and changing web page code, operating parameters, or the like, or by taking advantage of web programming weaknesses, etc. One way to detect an attack is to examine the contents of web pages provided by a web server in response to HTTP requests. The process of scanning web pages can be automated to a degree, such as by detecting changes to a web server's HTTP responses to HTTP requests for a web page, such as changes in the response time, or changes in web pages provided in response to identical requests. One challenge faced by automatic web scanners is that there are many things besides an attack that can cause a web server response to change, such as changing ad banners, time-stamps, page hit counters, and the like. Typically, such content can change even if web page requests are identical. As used herein, the term "dynamic" is used to indicate web page content that changes in the responses to identical web page requests. The term "static" is used to indicate web page content that does not change in the responses to identical web page requests.

Differential analysis is a technique used to compare two or more HTTP responses to determine if there are differences between them, and if so, identify the differences. One of the challenges of using differential analysis to analyze web pages is unknown web application behavior. For example, HTTP responses may contain dynamically generated content such as ad banners, page request counts, time stamps, and other elements that are independent of the request parameters. Two responses to identical requests can be the same with regard to the matter that was requested, but the responses may be different because their dynamic content has changed.

BRIEF DESCRIPTION OF THE DRAWINGS

The accompanying drawings are included to illustrate and provide a further understanding of the disclosed embodiments. In the drawings.

DETAILED DESCRIPTION

Reference will now be made in detail to the disclosed embodiments, examples of which are illustrated in the accompanying drawings.

Figure 1:
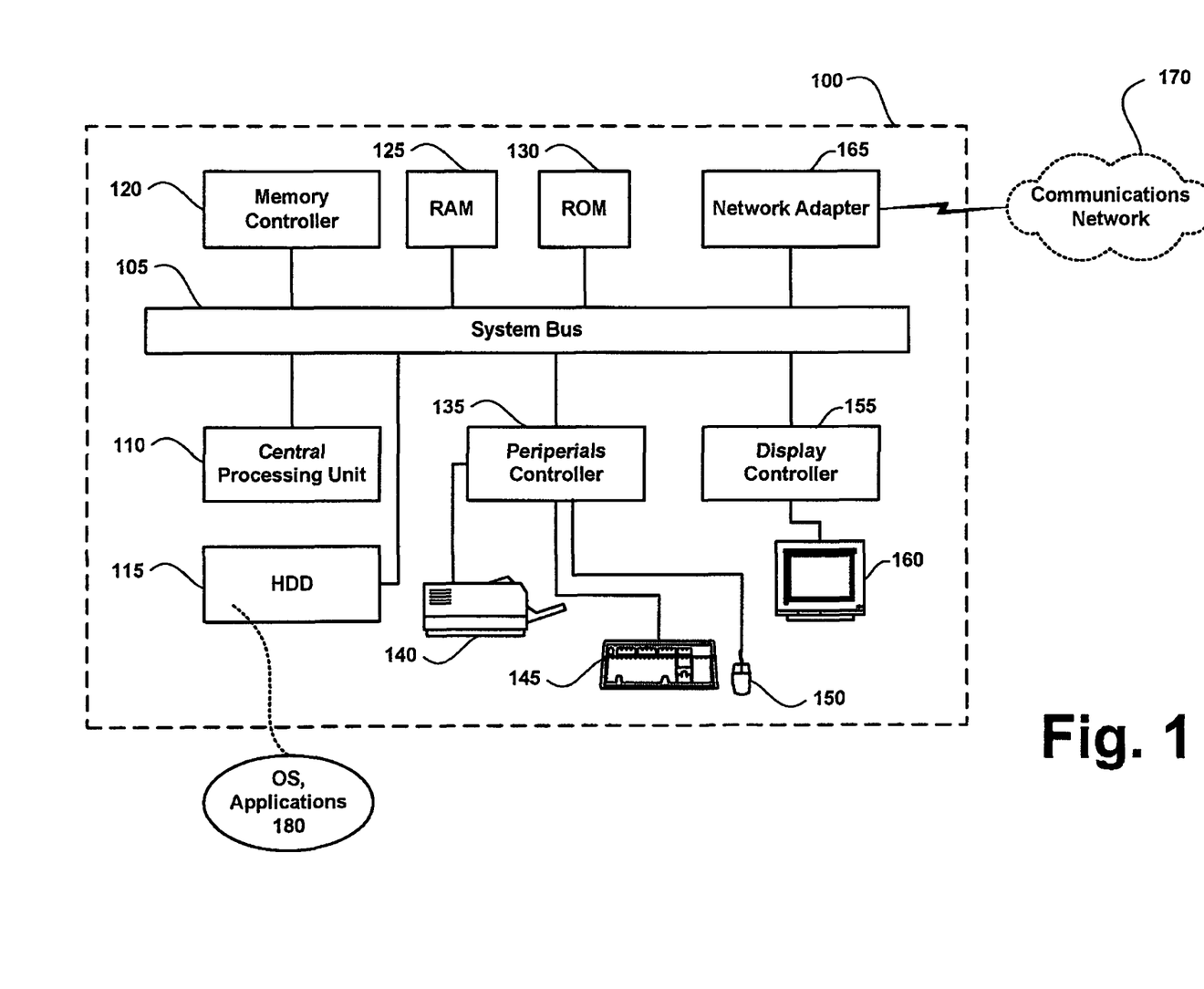
FIG. 1 is a block diagram of an exemplary computing system in accordance with an implementation of the herein described systems and methods.

FIG. 1 depicts an exemplary computing system 100 in accordance with herein described system and methods. Computing system 100 is capable of executing an operating system (OS) and a variety of computing applications 180. The operation of exemplary computing system 100 is controlled primarily by computer readable instructions, such as instructions stored in a computer readable storage medium, such as hard disk drive (HDD) 115, optical disk (not shown), solid state drive (not shown), or the like. Such software may be executed within central processing unit (CPU) 110 to cause computing system 100 to do work. In many known computer servers, workstations, and personal computers, CPU 110 is implemented on a micro-electronic chip called an integrated circuit.

It is appreciated that although the exemplary computing system 100 is shown to comprise a single CPU 110 that such description is merely illustrative as computing system 100 may comprise a plurality of CPUs 110. Additionally, computing system 100 may exploit the resources of remote CPUs (not shown) through communications network 170 or some other data communications means (not shown).

In operation, CPU 110 fetches, decodes, and executes instructions from a computer readable storage medium such as HDD 115. Such instructions can include an operating system (OS), executable programs, and the like. Information, such as computer instructions and other computer readable data, is transferred between components of computer system 100 via the computer's main data-transfer path. The main data-transfer path may use a system bus architecture 105, although other computer architectures (not shown) can be used, such as architectures using serializers and deserializers (serdes) to communicate data between devices over serial communication paths. System bus 105 typically includes data lines for sending data, address lines for sending addresses, and control lines for sending interrupts and for operating the system bus. An example of a system bus is the PCI (Peripheral Component Interconnect) bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing a processor and its support chips.

Memory devices coupled to system bus 105 include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process's virtual address space unless memory sharing between the processes has been set up.

In addition, computing system 100 may contain peripherals controller 135 responsible for communicating instructions from CPU 110 to peripherals, such as printer 140, keyboard 145, and mouse 150.

Display 160, which is controlled by display controller 155, is used to display visual output generated by computing system 100. Such visual output may include text, graphics, animated graphics, and video. Display 160 may be implemented with a CRT-based video display, an LCD-based flat-panel display, gas plasma-based flat-panel display, touch-panel, or the like. Display controller 155 includes electronic components required to generate a video signal that is sent to display 160.

Further, computing system 100 may contain network adapter 165 which may be used to couple computing system 100 to an external communication network 170, which may include or provide access to the Internet. Communications network 170 may provide computer users with means of communicating and transferring software and information electronically. Additionally, communications network 170 may provide for distributed processing, which involves several computers and the sharing of workloads or cooperative efforts in performing a task. It will be appreciated that the network connections shown are exemplary and other means of establishing a communications link between the computers may be used.

It is appreciated that exemplary computer system 100 is merely illustrative of a computing environment in which the herein described systems and methods may operate and does not limit the implementation of the herein described systems and methods in computing environments having differing components and configurations, as the inventive concepts described herein may be implemented in various computing environments having various components and configurations.

Figure 2:
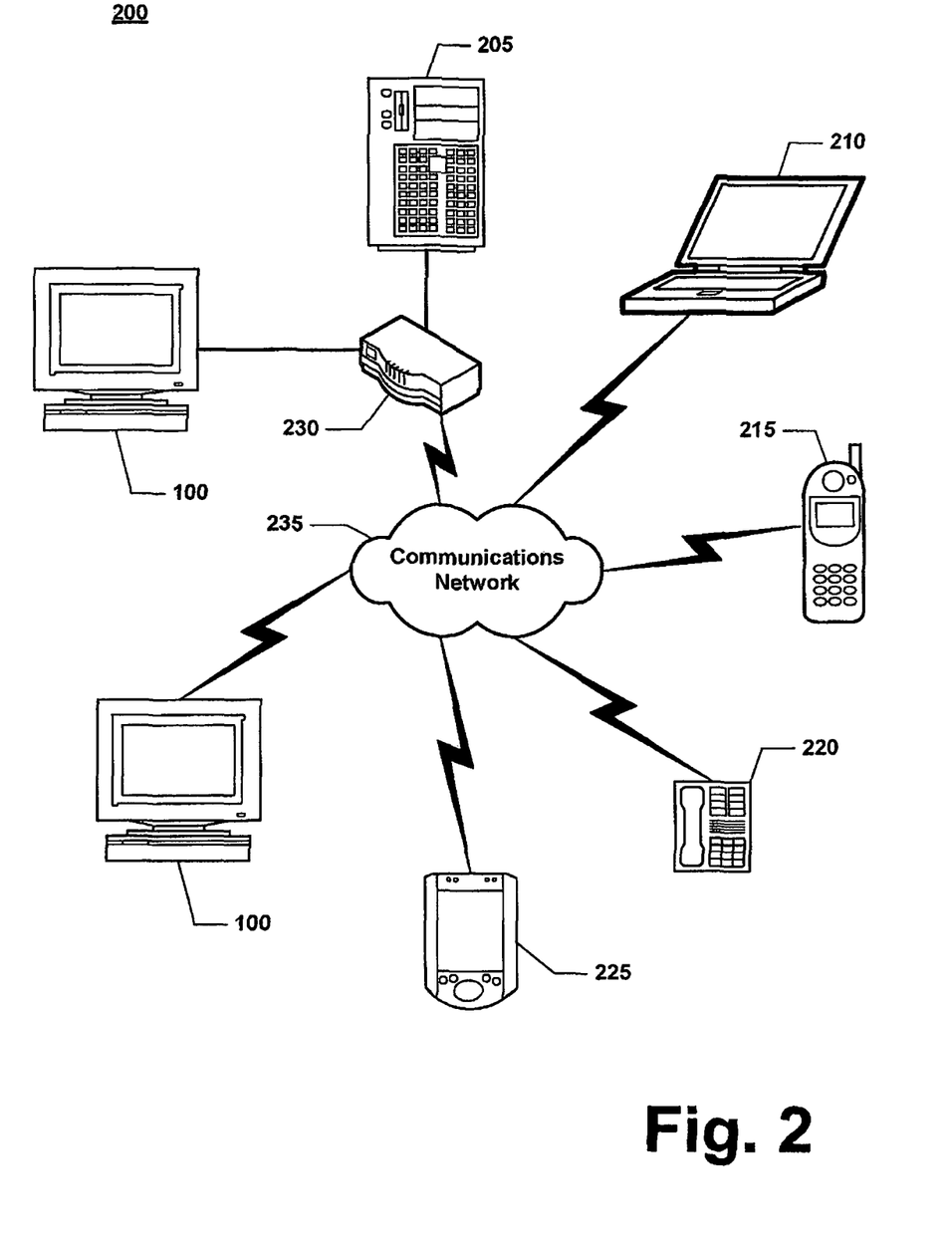
FIG. 2 is a block diagram showing an exemplary networked computer environment in accordance with an implementation of the herein described systems and methods.

Computing system 100, described above, can be deployed as part of a computer network. In general, the above description for computing environments applies to both server computers and client computers deployed in a networked environment. FIG. 2 illustrates an exemplary illustrative networked computing environment 200, with a server in communication with client computing environments via a communications network, in which the herein described apparatus and methods may be employed. As shown in FIG. 2, server 205 may be interconnected via a communications network (which may include any of, or a combination of, a fixed-wire or wireless LAN, WAN, intranet, extranet, peer-to-peer network, virtual private network, the Internet, or other communications network) with a number of client computing environments such as laptop computer 210, mobile telephone 215, voice over internet protocol (VoIP) telephone 220, personal digital assistant 225, computer systems 100, and/or other network enabled embedded devices/systems (not shown). In the exemplary environment, the communications network comprises a LAN wherein router 230 couples server 205 to a computer system 100 and to further communications network 235, which includes the Internet. Server 205 can comprise dedicated servers operable to process and communicate data to and from client computing environments 100, 210, 215, 220, 225, etc. via any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), or the like. Each client computing environment 100, 210, 215, 220, 225, etc. can be equipped with an operating system operable to support one or more computing applications, such as a web browser (not shown), or other graphical user interface (not shown), or a mobile desktop environment (not shown) to interact with server 205.

In operation, a user (not shown) may interact with a computing application running on a client computing environment to obtain desired data and/or computing applications. The data and/or computing applications may be stored on server computing environment 205 and communicated to cooperating users through client computing environments 100, 210, 215, 220, and 225, over the exemplary communications network. A participating user may request access to specific data and applications housed in whole or in part on server computing environment 205. Such data may be communicated between server 205 and client computing environments 100, 210, 215, 220, and 225 for processing and/or storage. Server 205 may host computing applications, processes and applets for the generation, authentication, encryption, and communication of data and applications and may cooperate with other server computing environments (not shown), third party service providers (not shown), network attached storage (NAS) and storage area networks (SAN) to realize application/data transactions.

In particular, a computing system 100 can send HTTP requests to server 205, and server 205 can respond by sending HTTP responses containing HTML code to the requesting computer system 100. The requesting computer system 100 may be located on a LAN with server 205, such as through router 230. Alternatively, computer system 100 may access server 205 via communications network 235, such as over the Internet. In either case, identical HTTP requests may result in different HTTP responses. Those different HTTP responses may be the result of normal operation, or they may be the result of a problem with the server 205, or a result of the activities of a hostile user.

The contents of the HTTP responses provided by server 205 can be scanned for changes, which can be helpful to an analyst in determining whether or not the changes are the result of normal operation. The process of scanning web pages can be automated to a degree, and it is helpful to the analyst to have the changes identified automatically, so that they can be more readily analyzed, such as by performing a differential analysis. An example of changes due to normal web server operation include HTTP responses that contain dynamically generated content such as ad banners, page request counts, time stamps and other elements that are independent of the request parameters. Two responses to identical requests can be the same with regard to the matter that was requested, but the responses may be different because their dynamic content has changed. It is helpful in performing a differential analysis comparing HTTP responses to properly identify the static and dynamic portions of the responses. Using differential analysis, one or more baselines can be established as bases for the comparison of HTTP responses.

Figure 3:
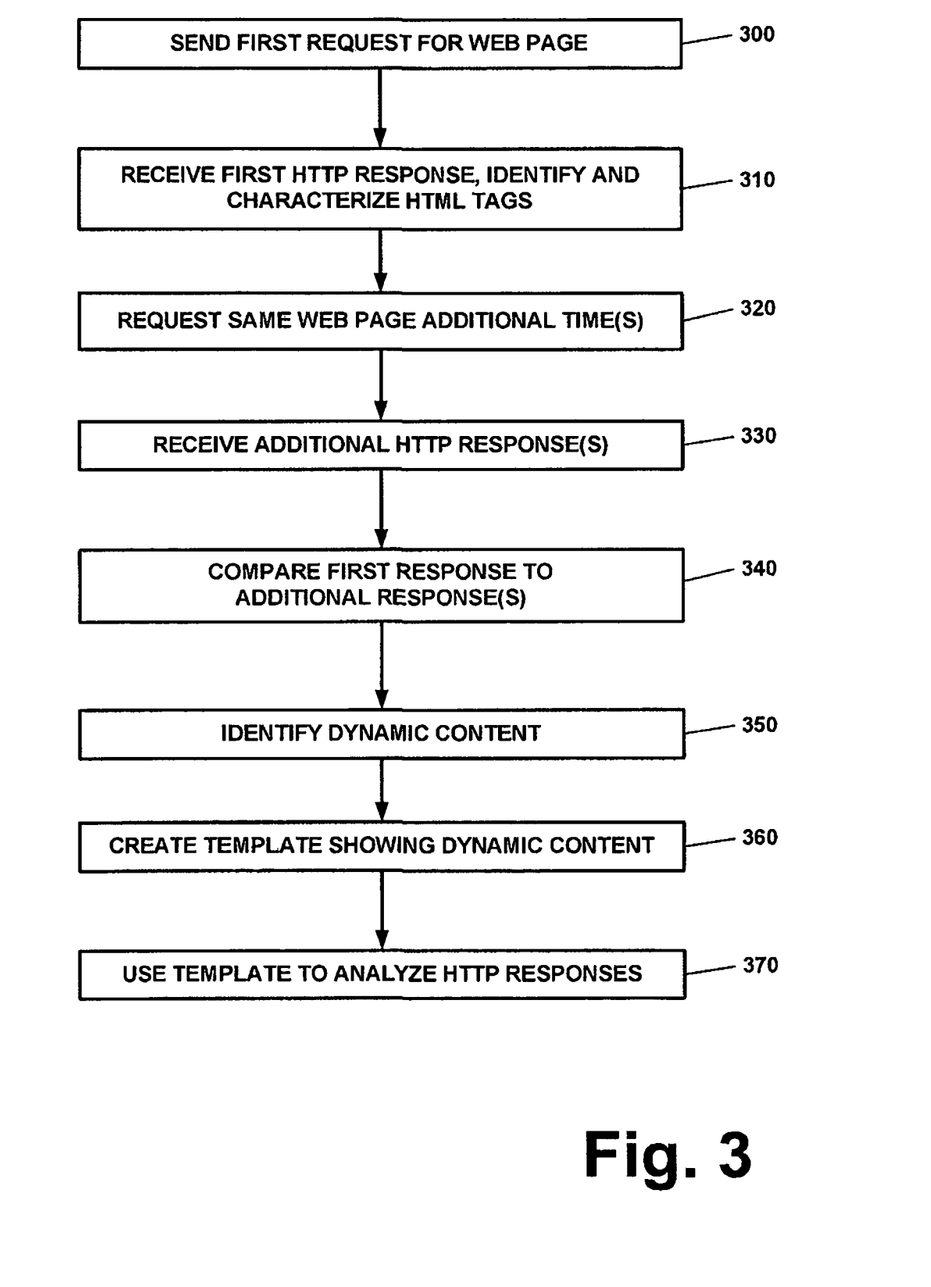
FIG. 3 is a flowchart diagram showing the processing performed by an exemplary system for baselining HTTP responses when creating a template for use in differential analysis of HTTP responses.

FIG. 3 is a flow chart showing the processing performed by an exemplary system for baselining HTTP responses for use in differential analysis of HTTP responses. The process begins at block 300 by sending a first HTTP request, such as a request for a web page, from computer system 100 to server 203. Computer system 100 may share a LAN with server 205, in which case it can send the HTTP request via the LAN. Alternatively, computer system 100 can be located anywhere Internet access is available, and may send the HTTP request over the Internet. Computer system 100 receives and stores a first response, 310. Next, one or more additional identical requests are sent, 320; and respective additional HTTP responses are received and stored, 330. The first response is compared to each additional response, 340. Changes between the first response and each additional response are identified as dynamic content, 350. A template is created showing the dynamic content, 360. The template can then be used to analyze the HTTP responses, 370, such as to determine whether or not the dynamic content is the result of normal operation.

In an exemplary embodiment, the portions of the HTTP responses that are identical to corresponding portions of the first response are identified as static content. The static content can also be included in the template, or indicators of the static content can be included in the template.

Requesting a page only twice or only a few times may not capture dynamic areas that change after a certain number of requests, such as on every 10th request, or after a varying number of requests. Thus, in an embodiment the additional requests after the first request can be based on a select number of requests, such as a number of requests selected by a user.

Furthermore, web pages may have features that change regularly or frequently, such as a quote of the day, or a weather forecast. Those features may change between the time (or date) the template is created and the time (or date) it is used, for example, to investigate a possible attack on the web server. Thus, in an embodiment, the additional requests after the first request can additionally, or alternatively, be based on the passage of a select amount of time, such as an amount of time selected by a user.

In an embodiment, the dynamic content can be made more easily recognizable by an analyst. That can be done in many ways, such as by tagging each identified instance of dynamic content. Such tagging can include surrounding each instance of dynamic content with easily recognizable characters that set it off from other content. Alternatively or in addition, the dynamic content can be highlighted, for example, by changing the formatting attributes such as using a different font, different color font, different size font, using bold, italics, underlining, indenting, and/or adding space before and/or after each identified instance or section of dynamic content. In this way, the dynamic content can be more easily recognized by the analyst.

In an embodiment in identifying the dynamic and/or the static content, the HTML tags of the responses can be identified and optionally characterized. Tags of the HTML can be identified by their angle brackets or other formatting attributes in accordance with HTML standards, guidelines, rules, and/or definitions. Information of the HTML tags can be used to characterize them as associated with content that may not change between responses, i.e., as unchangeable HTML tags. Other HTML tags can be characterized as associated with content that may change between responses. Changeable content can be further characterized according to whether it does or does not actually change between the first response and any of the subsequent responses. For example, HTML tags associated with content that may, but does not, change between the first response and all subsequent responses can be characterized as static HTML tags. HTML tags associated with content that may change and in fact does change between the first response and any subsequent response can be characterized as dynamic HTML tags. The content that changes can be identified as dynamic content. Identifying and characterizing the HTML tags can be accomplished by consulting HTML standards, guidelines, rules, and/or definitions (collectively, "rules"), such as HTML rules stored in a storage device, to identify the tags associated with content that may change and the tags associated with content that may not change.

The template can be created in any of various ways. For example, the template may include information of both the static and the dynamic content. Alternatively, the template may include only information of the dynamic content, such as by removing the static content from the template, or by not including the static content in the template.

Figure 4:
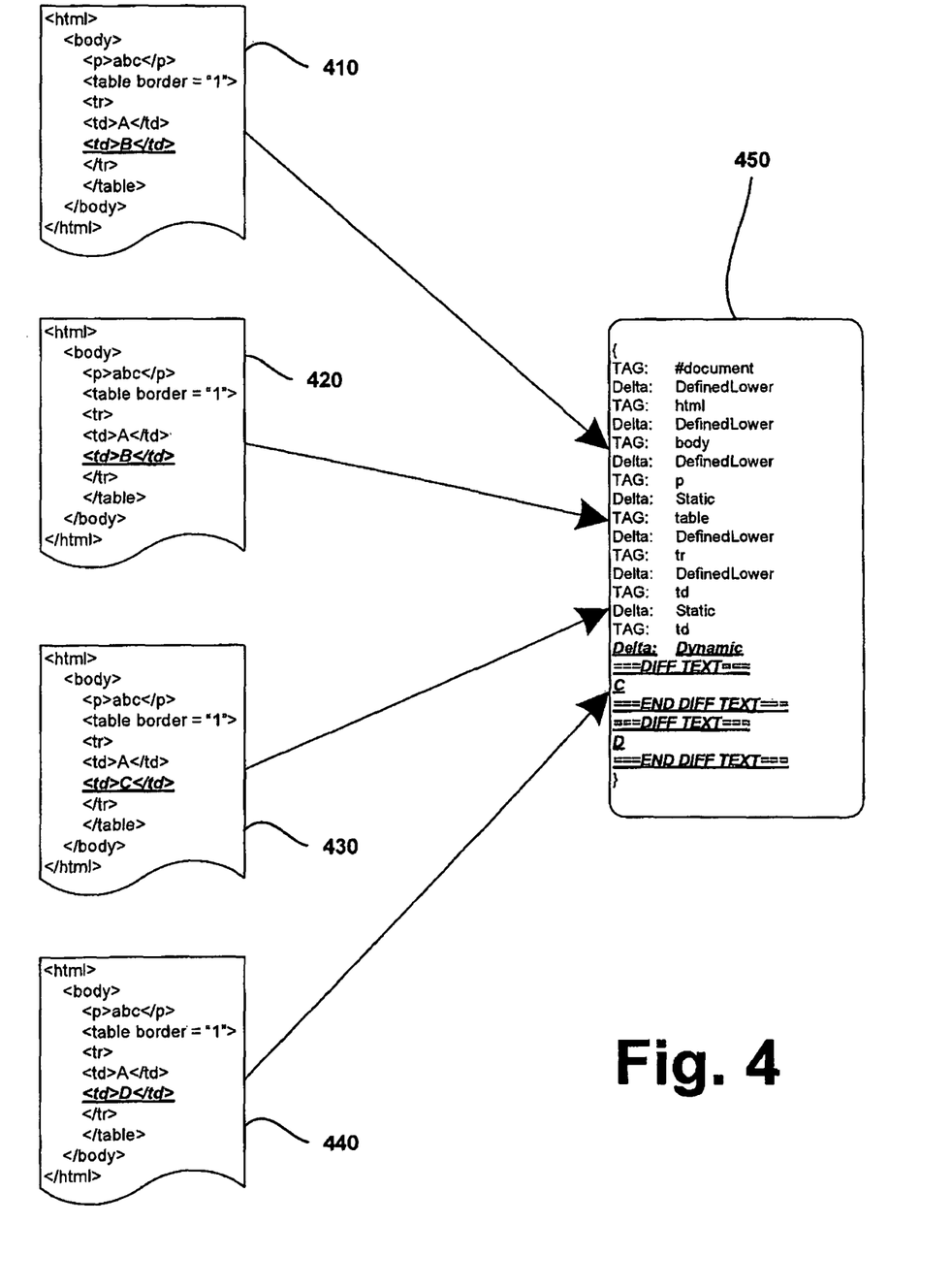
FIG. 4 shows the creation of an exemplary template from exemplary HTTP responses in accordance with an implementation of the herein described systems and methods.

FIG. 4 illustrates the creation of an exemplary template from exemplary HTTP responses. Responses 410, 420, 430, and 440 are received in response to identical HTTP requests. Although four responses are shown, any number of requests greater than one can be used to generate the template. As shown, the HTTP responses include HTML, such as could be rendered by a web browser to present a web page viewable by a user. HTML tags are identifiable by their angle brackets. One of the HTML tags (the "table" tag) is shown to have an attribute associated with it (border="1"), and other tags (the "td," or table data, tags) have content associated with them. It is appreciated that the use of particular HTML tags in this example are for illustration only, and actual responses may contain the same or other tags and other information. The first two responses, 410 and 420, are identical. If a template were created from just those two responses, no dynamic content would be identified. The next two responses, 430 and 440, each include a different change from first response 410, which can be identified as dynamic content. For purposes of illustration, the changed content is shown in the responses in bold-underline-italic font, but it is understood that actual responses would not include such formatting. Illustratively, the content "B" contained between the "td" start and end tags changes in the third response 430 to "C", and changes again in the fourth response 440 to "D".

Template 450 is created based on all four responses. Template 450 is formed by identifying the dynamic content and including it in the template. Thus, the changed text "C" and "D" are both included in the template. In this example template, the dynamic content is tagged by setting it off from other content by preceding each instance of dynamic content with the line "===DIFF TEXT===", and following each instance of dynamic content with the line "===END DIFF TEXT===", so that it would be easily recognizable by an analyst. In addition, the formatting of the dynamic content and added lines is made bold-underline-italic, so that it would be even more easily recognizable by an analyst. The template also contains information of the HTML tags in the responses. Each HTML "TAG" is identified and characterized as: not being associated with content that could change (Defined-Lower); being associated with content that could change but does not change (Static); or being associated with content that could change and in fact does change (Dynamic). Although this example includes particular formatting and content, other formatting and content could also be used, provided that the dynamic content is identified and included. An analyst would then use the template to further analyze the responses.

Figure 5:
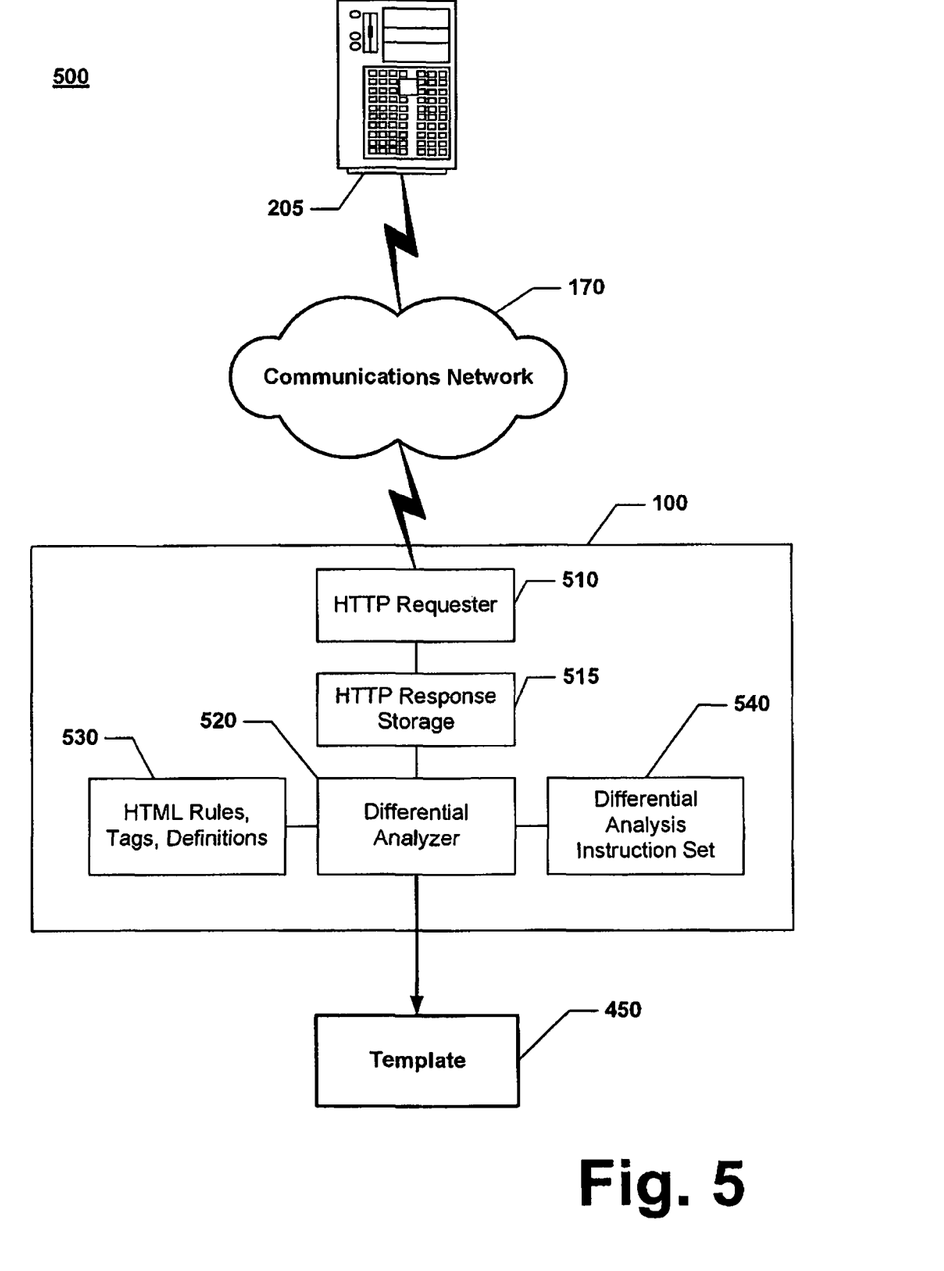
FIG. 5 is a block diagram showing cooperating exemplary components of an exemplary system for baselining HTTP responses.

FIG. 5 is a block diagram showing cooperating exemplary components of an exemplary system for generating a template for use in differential analysis of HTTP responses to identical HTTP requests. Computer system 100 includes HTTP requester 510 which sends a plurality of identical HTTP requests to server 205 via communications network 170. Communications network 170 can include any of a wired or wireless LAN, WAN, intranet, extranet, peer-to-peer network, virtual private network, the Internet, or other communications network. Server 205 responds to the requests with HTTP responses, which are received and stored in HTTP response storage 515 of computer system 100. Differential analyzer 520 accesses the stored HTTP responses and compares them to identify dynamic content. Differential analyzer 520 then generates and outputs template 450, such as by printing or displaying for use by an analyst to perform a differential analysis of the responses. HTML block 530 containing HTML information, such as HTML rules, tags, and definitions, which may be stored in a storage device of computer system 100 or at any other location accessible by differential analyzer 520, are used by differential analyzer 520 to identify and characterize HTML tags of the HTTP responses. Differential analysis instruction set 540, which also may be stored in a storage device of computer system 100 or at any other location accessible by differential analyzer 520, are used by differential analyzer 520 to perform the comparison of the HTTP responses, and to generate template 450. Instruction set 540 may also include instructions used by HTTP requester 510 to control the number and timing of the plurality of identical HTTP requests sent to server 205. In an embodiment, the number and timing of HTTP requests may be selected by a user.

Using such a template may enable an analyst to more easily identify key areas of a web page by providing a simplistic representation of the page. In addition, use of the template can result in increased accuracy and speed of differential analysis by enabling the analyst to compare only the portions of the responses that are shown to have changed from the first response. Furthermore, it is harder to mistakenly identify content as dynamic content that is not, in fact, dynamic. Thus, the template can be relied on to accurately indicate actual dynamic content in HTTP responses to identical requests.

Various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of identifying dynamic content in HyperText Transfer Protocol (HTTP) responses to web page requests, comprising:
    sending a first request for a web page;
    receiving a first HTTP response to the first request;
    sending at least one additional request for a web page identical to the first request;
    receiving at least one respective additional HTTP response to the at least one additional request;
    comparing, by a computing system having a central processing unit, the first HTTP response to each of the at least one additional HTTP response;
    identifying, by the computing system, portions of the at least one additional HTTP response that are different from corresponding portions of the first HTTP response as dynamic content;
    generating, by the computing system, a template that designates the dynamic content; and
    outputting, by the computing system, the template.

2. The method of claim 1, further comprising identifying portions of the at least one additional HTTP response that are identical to corresponding portions of the first HTTP response as static content.

3. The method of claim 1, wherein a number of the at least one additional request sent is based on a select number of requests.

4. The method of claim 1, wherein a number of the at least one additional request sent is based on passage of a select amount of time.

5. The method of claim 1, wherein generating the template that designates the dynamic content includes tagging the dynamic content in the template.

6. The method of claim 1, further comprising:
    identifying HTML tags in the first response; and
    characterizing the identified HTML tags in the template.

7. The method of claim 6, wherein the characterizing includes:
    identifying HTML tags associated with content that may not change between responses as unchangeable HTML tags,
    identifying HTML tags associated with content that may, but does not, change between the first response and all subsequent responses as static HTML tags;
    identifying HTML tags associated with content that may change and does change between the first response and any subsequent response as dynamic HTML tags; and
    identifying the content that changes as dynamic content.

8. The method of claim 7, wherein the steps of identifying HTML tags comprise consulting HTML rules stored in a storage device to identify the tags associated with content that may change and the tags associated with content that may not change.

9. A non-transitory computer readable storage medium storing computer readable instructions which when executed by a computer cause the computer to perform a method of identifying dynamic content in HyperText Transfer Protocol (HTTP) responses to web page requests, the method comprising:
    sending a first request for a web page;
    receiving a first HTTP response to the first request;
    sending at least one additional request for a web page identical to the first request;
    receiving at least one respective additional HTTP response to the at least one additional request;
    comparing the first HTTP response to each of the at least one additional HTTP response;
    identifying portions of the at least one additional HTTP response that are different from corresponding portions of the first HTTP response as dynamic content;
    generating a template that designates the dynamic content; and
    outputting the template.

10. A system for use in performing differential analysis of a plurality of hypertext transfer protocol (HTTP) responses, the system comprising:
    at least one central processing unit (CPU);
    an HTTP requester for sending a plurality of identical HTTP requests;
    an HTTP response storage block for receiving and storing a plurality of HTTP responses received responsive to the plurality of identical HTTP requests; and
    instructions executable on the at least one CPU to:

compare a first of the HTTP responses to a second of the HTTP responses;

identify a portion of the first HTTP response that is different from a corresponding portion of the second HTTP response as dynamic content;

generate a template that identifies the dynamic content.

11. The method of claim 1, further comparing using the template to analyze HTTP responses for detecting unauthorized access of a server that provided the analyzed HTTP responses.

12. The non-transitory computer-readable storage medium of claim 9, wherein the method further comprises:

identifying a portion of the at least one additional HTTP response that is identical to a corresponding portion of the first HTTP response as static content; and designating the static content in the template.

13. The non-transitory computer-readable storage medium of claim 9, wherein the method further comprises using the template to analyze HTTP responses for detecting unauthorized access of a server that provided the analyzed HTTP responses.

14. The system of claim 10, wherein the instructions are executable to further:

identify a portion of the first HTTP response that is identical to a corresponding portion of the second HTTP response as static content; and designate the static content in the template.

15. The system of claim 10, wherein the instructions are executable to further use the template to analyze HTTP responses for detecting unauthorized access of a server that provided the analyzed HTTP responses.

* * * * *

UNITED STATES PATENT AND TRADEMARK OFFICE
CERTIFICATE OF CORRECTION

| | | |
|---|---|---|
| PATENT NO. | : 8,938,530 B2 | Page 1 of 1 |
| APPLICATION NO. | : 12/365771 | |
| DATED | : January 20, 2015 | |
| INVENTOR(S) | : William Matthew Hoffman | |

It is certified that error appears in the above-identified patent and that said Letters Patent is hereby corrected as shown below:

In the Drawings

In sheet 1 of 5, fig. 1, reference numeral 135, line 1, delete "periperials" and insert -- peripherals --, therefor.

Signed and Sealed this
Twenty-sixth Day of May, 2015

Michelle K. Lee
*Director of the United States Patent and Trademark Office*